(12) United States Patent
Zhu

(10) Patent No.: US 11,407,419 B2
(45) Date of Patent: Aug. 9, 2022

(54) CENTRAL LINE SHIFTING BASED PRE-CHANGE LANE PATH PLANNING

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 288 days.

(21) Appl. No.: 16/730,165

(22) Filed: Dec. 30, 2019

(65) Prior Publication Data

US 2021/0197823 A1 Jul. 1, 2021

(51) Int. Cl.
| | |
|---|---|
| *B60W 30/18* | (2012.01) |
| *G08G 1/16* | (2006.01) |
| *G05D 1/02* | (2020.01) |
| *B60W 60/00* | (2020.01) |

(52) U.S. Cl.
CPC .... *B60W 30/18163* (2013.01); *B60W 60/001* (2020.02); *G08G 1/167* (2013.01); *B60W 2520/12* (2013.01); *B60W 2554/40* (2020.02); *G05D 1/0212* (2013.01); *G05D 2201/0213* (2013.01)

(58) Field of Classification Search
CPC ......... B60W 30/18163; B60W 60/001; B60W 2520/12; B60W 2554/40; G05D 1/0212; G05D 2201/0213; G08G 1/167
See application file for complete search history.

(56) References Cited

U.S. PATENT DOCUMENTS

| | | | | |
|---|---|---|---|---|
| 2018/0293894 | A1* | 10/2018 | Zhang | G01S 17/86 |
| 2018/0345978 | A1* | 12/2018 | Fujii | B62D 15/0255 |
| 2019/0315367 | A1* | 10/2019 | Um | B60W 50/10 |
| 2019/0382021 | A1* | 12/2019 | Niibo | B60W 10/04 |
| 2020/0094836 | A1* | 3/2020 | Aoki | B60W 60/0015 |
| 2020/0207353 | A1* | 7/2020 | Chen | B60W 30/18163 |
| 2021/0171042 | A1* | 6/2021 | Hayakawa | B60W 30/18163 |

* cited by examiner

*Primary Examiner* — Anshul Sood
(74) *Attorney, Agent, or Firm* — Womble Bond Dickinson (US) LLP

(57) ABSTRACT

A method, apparatus, and system for executing a lane change is disclosed. That an ADV is in a lane changing region for an anticipated lane change into a neighboring target lane in a first direction is determined. The first direction is either a left direction or a right direction in a direction of travel of the ADV. A reference line is moved toward the target lane in the first direction at a predetermined rate while the reference line is kept within a current lane of the ADV. A gap in traffic for the anticipated lane change is searched for. Thereafter, in response to finding the gap in traffic for the anticipated lane change, the ADV is controlled to complete the lane change into the target lane.

21 Claims, 7 Drawing Sheets

CENTRAL LINE SHIFTING BASED PRE-CHANGE LANE PATH PLANNING

TECHNICAL FIELD

Embodiments of the present disclosure relate generally to operating autonomous vehicles. More particularly, embodiments of the disclosure relate to path planning for a lane change.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Planning and executing a lane change for an autonomous vehicle can be a challenging task, especially when the autonomous vehicle needs to be merged into traffic in the target lane. The difficulties associated with the search for a gap in traffic for the lane change are exacerbated when the intention of the autonomous vehicle to change the lane is not adequately signaled to the vehicles in the target lane.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
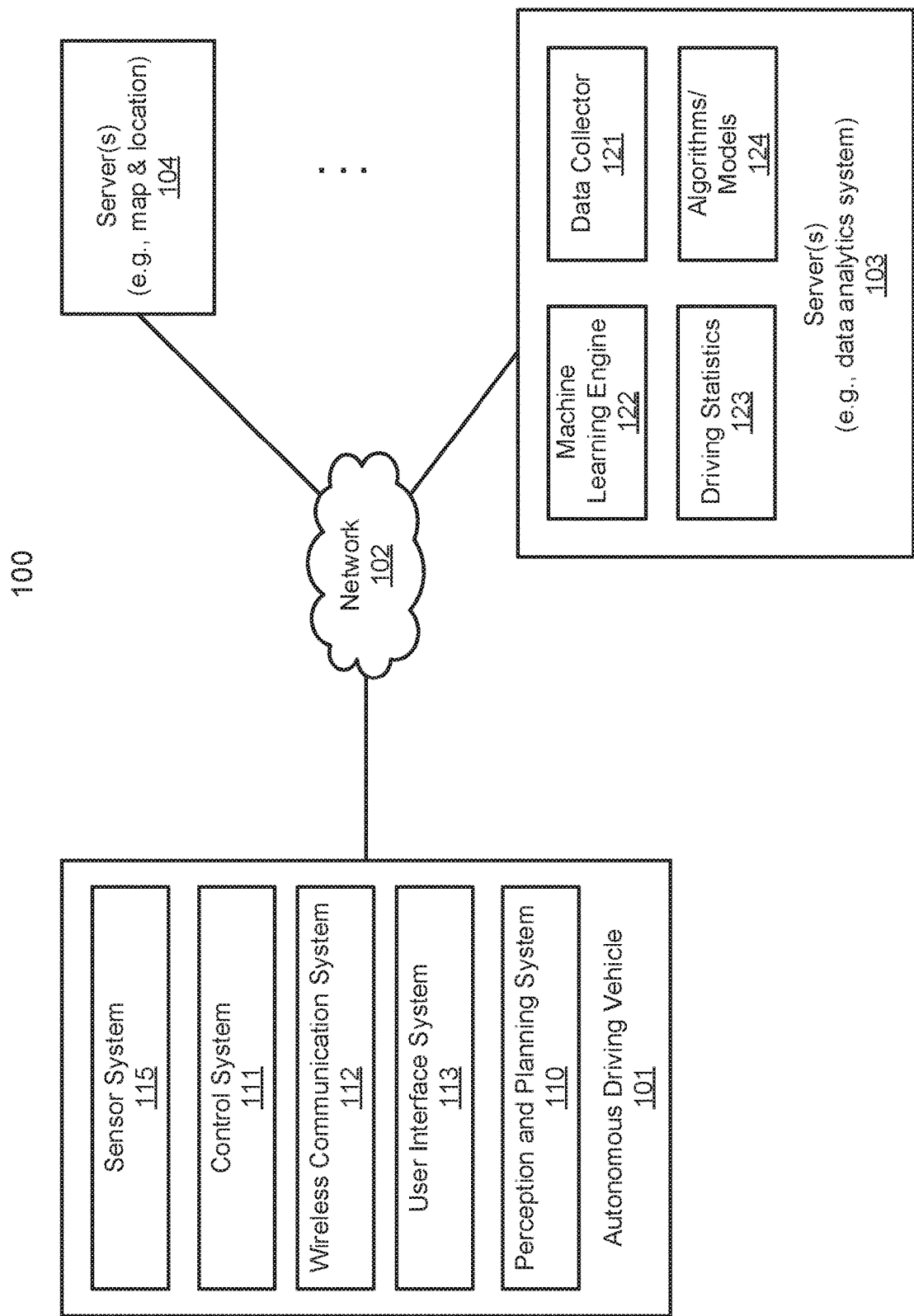
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, the reference line of an autonomous driving vehicle (ADV) is gradually moved toward the target lane for an anticipated lane change while being kept within the current lane of the ADV prior to a gap in traffic is found for the execution of the lane change. Accordingly, traveling forward, the ADV also moves laterally toward the boundary of the current lane in the direction of the anticipated lane change before the lane change is actually executed. The lateral in-lane motion of the ADV prior to the lane change serves to signal the anticipated lane change to (the drivers of) the vehicles in the target lane, and also reduces the lateral distance that needs to be traversed when the lane change is executed. The signaling as well as the lateral in-lane motion toward the target lane makes it more likely that a gap in traffic can be successfully found for the execution of the lane change.

In particular, that an ADV is in a lane changing region for an anticipated lane change into a neighboring target lane in a first direction is determined. A reference line is moved toward the target lane in the first direction at a predetermined rate while the reference line is kept within a current lane of the ADV. Further trajectory or path to drive the ADV is planned based on the modified reference line to control the ADV to move towards the lane boundary between the current lane and the target lane in preparing the lane changing. A gap in traffic for the anticipated lane change is searched for. Thereafter, in response to finding the gap in traffic for the anticipated lane change, the ADV is controlled to complete the lane change into the target lane.

In one embodiment, the first direction is either a left direction or a right direction in a direction of travel of the ADV. In one embodiment, the predetermined rate is between 0.1 m/s and 0.5 m/s in a lateral speed. In one embodiment, moving the reference line toward the target lane in the first direction at the predetermined rate comprises deflecting the reference line toward the target lane away from a direction of the current lane by a predetermined deflection angle. In one embodiment, the moving of the reference line toward the target lane in the first direction is subject to a predetermined maximum lateral speed. In one embodiment, prior to finding the gap in traffic for the anticipated lane change, the reference line is moved toward the target lane in the first direction until a distance between the reference line and a boundary of the current lane of the ADV is at or below a predetermined threshold such as 0.2 meters. However, such a threshold may be determined in view of the vehicle width of the ADV, such that the body of the vehicle does not enter or occupy the target lane in preparing the lane changing.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
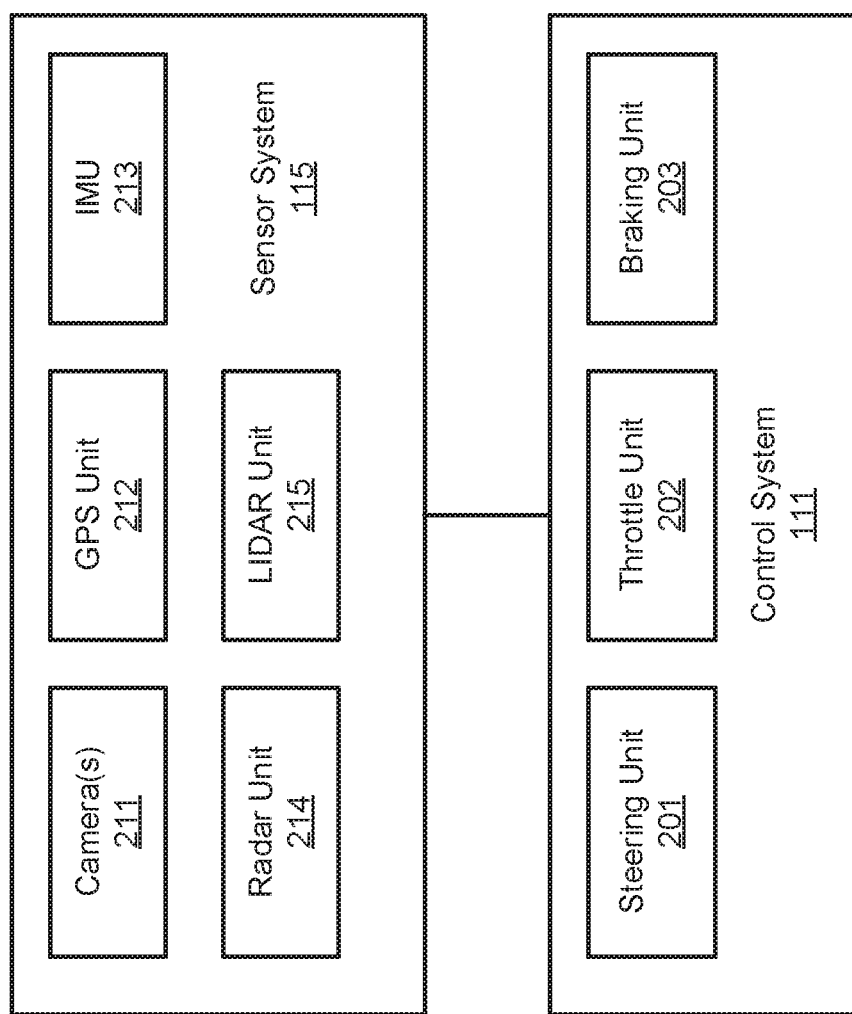
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 may include an algorithm to modify a reference line in preparing for lane changing to provide an indication to a vehicle in the target lane that an ADV is about to change lane, as well as an algorithm to determine a lane changing region. Algorithms 124 can then be uploaded on ADVs to be utilized during autonomous driving in real-time.

Figure 3A:
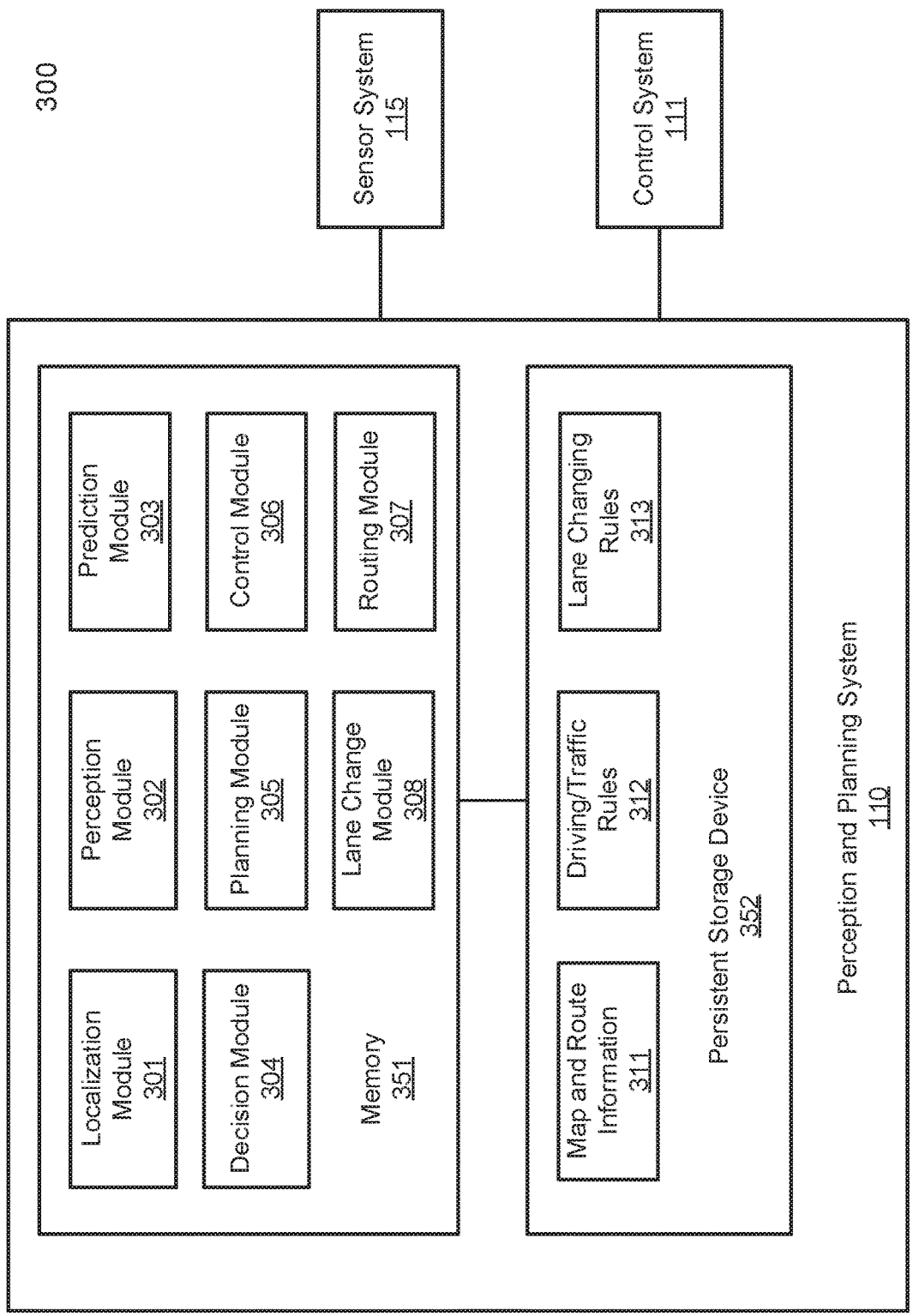
FIGS. 3A-3B are block diagrams illustrating an example of a perception and planning system used with an autonomous vehicle according to one embodiment.
Figure 3B:
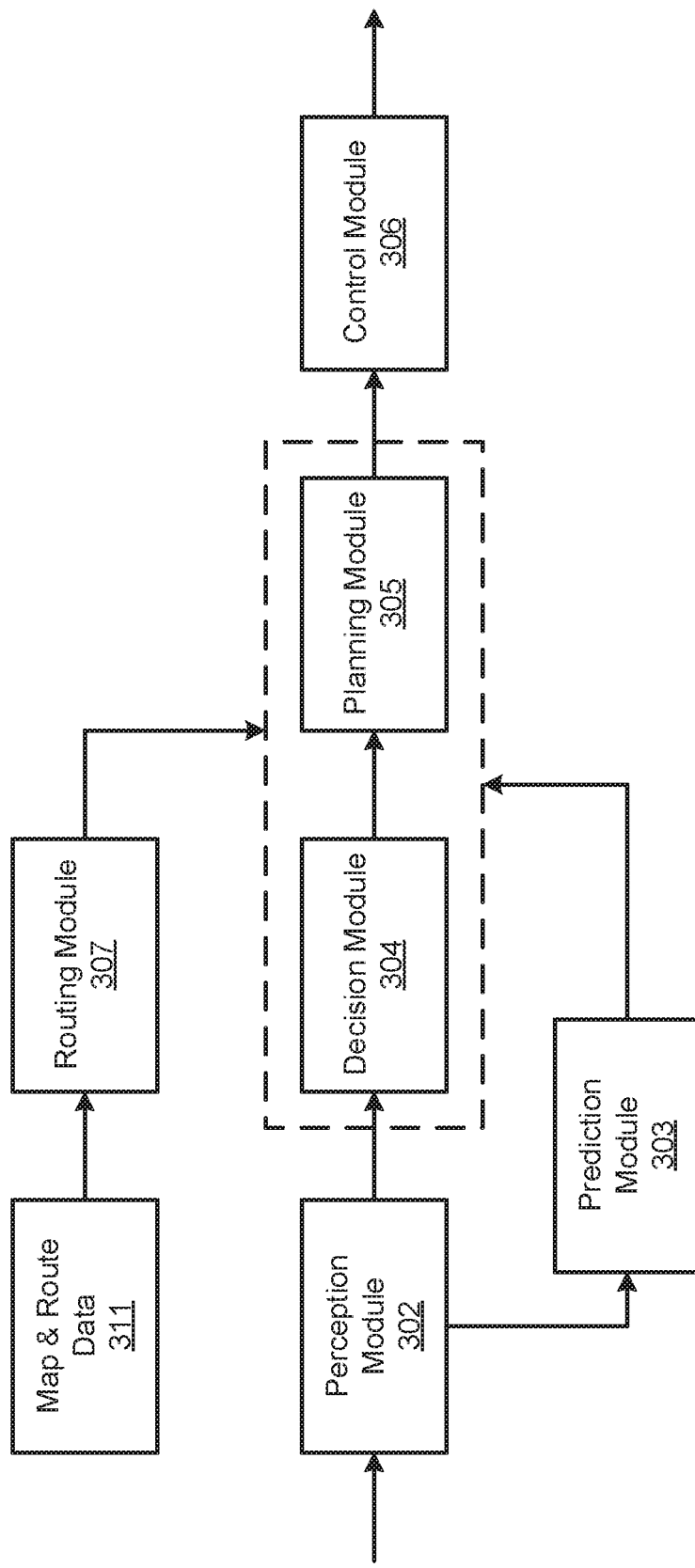

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and lane change module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, lane changing module 308 is responsible for handling lane changing driving scenario based on a set of one or more lane changing rules 313. Lane changing module 308 may be integrated with planning module 305. When a request for lane changing is received, for example, from decision module 304, lane changing module 308 is to modify the reference line of the current lane gradually towards, according to a predetermined formula, to a lane boundary between the current lane and a target lane to which the ADV is to change. Based on the modified reference line, a trajectory or a path is planned, for example, by planning module 305 to control the ADV to move within the current lane but towards to the target lane in preparing lane changing but before the actual lane changing. Such a move towards the lane boundary will provide an indication to other vehicles in the target lane that the ADV intends to change lane from the current lane to the target lane. Other vehicles may either slow down or accelerate to provide a large enough space for the ADV to change lane.

The reference line is repeatedly modified in each planning cycle until the ADV is within a predetermined distance with the target lane while maintaining the ADV within the current lane. Meanwhile the system looks for a gap or lane changing space to change lane. If there is no big enough gap available for lane changing, the ADV may be maintained within the current lane but close to the lane boundary representing an intention of lane changing to the other vehicles in target lane and the current lane. In one embodiment, a gap for lane changing may be determined based on the driving environment at the point in time, such as, for example, the current speed of ADV and other vehicles moving in the target lane. In one embodiment, a gap that is big enough for lane changing is a period of time in which the ADV will not collide with the vehicles in the target lane when the lane changing occurs, if the ADV and other vehicles were moving at their current speeds. In a particular embodiment, the period of time is at least 8 seconds.

Figure 4:
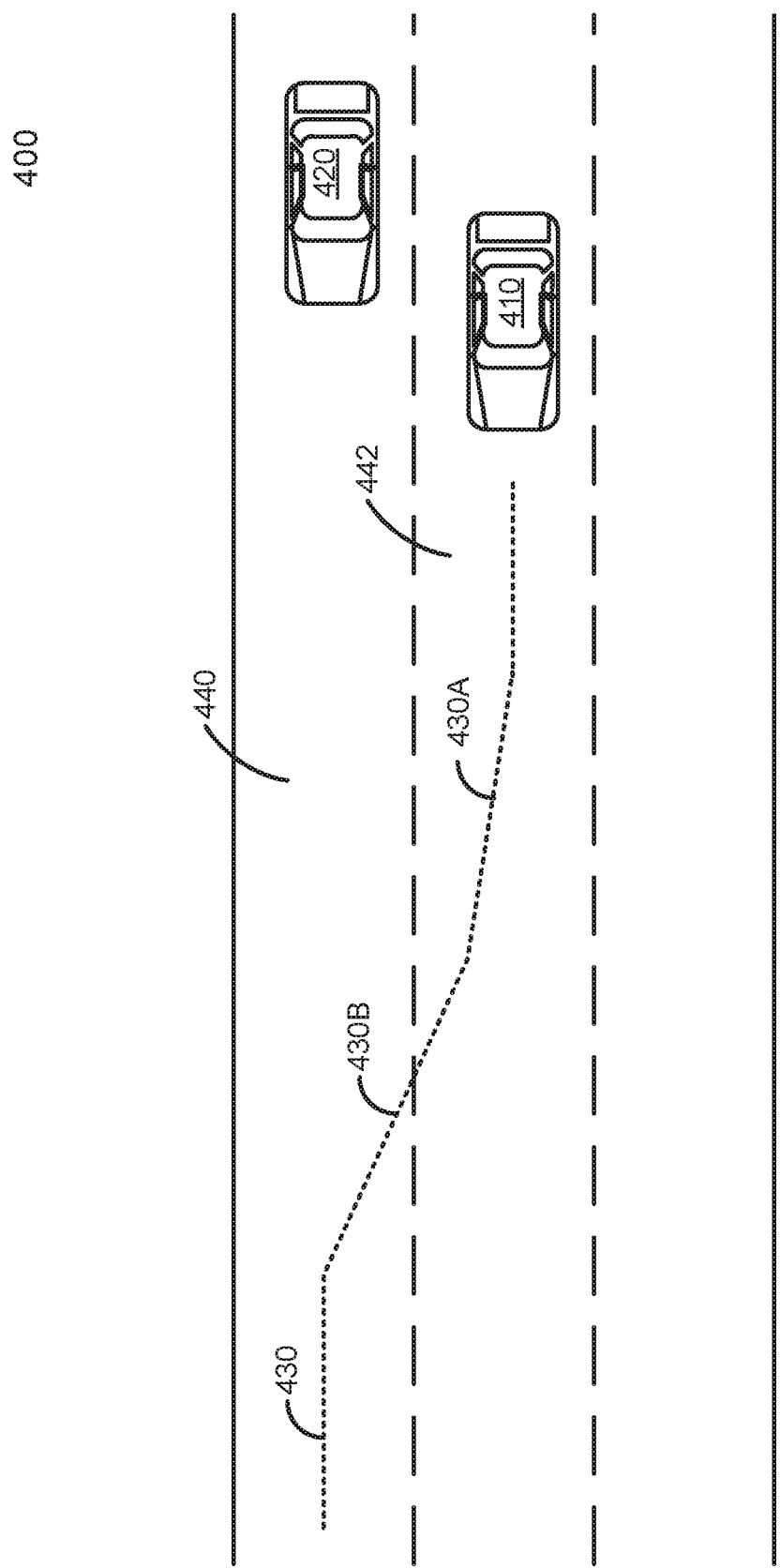
FIG. 4 is a diagram illustrating an example environment in which embodiments of the disclosure may be practiced.

Referring to FIG. 4, a diagram illustrating an example environment 400 in which embodiments of the disclosure may be practiced is shown. The ADV 410 anticipates a lane change into the target lane 440 to the right in the direction of travel. That the ADV 410 is in a lane changing region for the anticipated rightward lane change into the target lane 440 is determined. The information about the lane changing region is available at one or more of: routing module 307, decision module 304, or planning module 305. For example, decision module 304 may at certain point that there is a need to change lane for the ADV given the current driving environment. A lane changing region refers to a region within which a vehicle can legally change lane according to the traffic rules. For example, if a lane line between two adjacent lanes is a broken or dash line, a vehicle is allowed to change lane. Such lane changing region information can be provided by routing module 307 in view of the map or other traffic information. Alternatively, it can also be determined based on perception, for example, by recognizing the lane line patterns based on images, etc.

At the segment 430A, the reference line 430 is moved or modified rightwardly towards the target lane 440 at a predetermined rate while the reference line 430 is kept within a current lane 442 of the ADV 410. The value of the predetermined rate does not limit the disclosure. For example, the predetermined rate can be between 0.1 m/s and 0.5 m/s in the lateral speed. In one embodiment, the predetermined rate is 0.3 m/s (i.e., if there are 10 planning cycles in one second, the reference line is moved laterally by 0.03 m in each cycle).

In one embodiment, moving the reference line 430 rightwardly towards the target lane 440 at the predetermined rate comprises deflecting the reference line 430 toward the target lane 440 away from a direction of the current lane 442 by a predetermined deflection angle. The measurement of the deflection angle does not limit the disclosure. In one embodiment, the deflection angle may be 3° (i.e., the lateral speed in this case equals to tan 3°*the speed in the lane direction). In one embodiment, the rightward moving of the reference line 430 toward the target lane 440 is subject to a predetermined maximum lateral speed (i.e., 3 m/s). It should be appreciated that the predetermined maximum lateral speed does not limit the disclosure.

In one embodiment, prior to finding the gap in traffic for the anticipated lane change, the reference line 430 is moved rightwardly towards the target lane 440 until a distance between the reference line 430 and the right boundary of the current lane 442 of the ADV 410 is at or below a predetermined threshold. The value of the predetermined threshold does not limit the disclosure. In one embodiment, the predetermined threshold may be 0.2 m. However, such a threshold may be determined in view of the vehicle width of the ADV, such that the body of the vehicle does not enter or occupy the target lane in preparing the lane changing. Maintaining a safe distance between the reference line 430 and the boundary of the current lane 442 ensures that the ADV 410 stays within the current lane 442 and does not intrude into the neighboring lane before the lane change can be safely executed.

Accordingly, traveling forward, the ADV 410 also moves laterally to the right toward the boundary of the current lane 442 in the direction of the anticipated lane change before the lane change is actually executed. The rightward lateral in-lane motion of the ADV 410 prior to the lane change serves to signal the anticipated lane change to (the drivers of) the vehicles (e.g., vehicle 420) in the target lane 440, and also reduces the lateral distance that needs to be traversed by the ADV 410 when the lane change is executed.

A gap in traffic for the anticipated lane change is searched for. The signaling as well as the lateral in-lane motion toward the target lane 440 makes it more likely that a gap in traffic can be found for the execution of the lane change. Thereafter, corresponding to segment 430B on the reference line 430, in response to finding the gap in traffic for the anticipated lane change, the ADV 410 is controlled by planning module 305 and control module 306 to complete the lane change into the target lane 440.

In another embodiment, the ADV 410 is controlled to execute a leftward lane change. It should be appreciated that although a rightward lane change is illustrated in FIG. 4 and described, it is within the skills of a person of ordinary skill in the art to make necessary adaptations of the description for embodiments associated with a leftward lane change.

Figure 5:
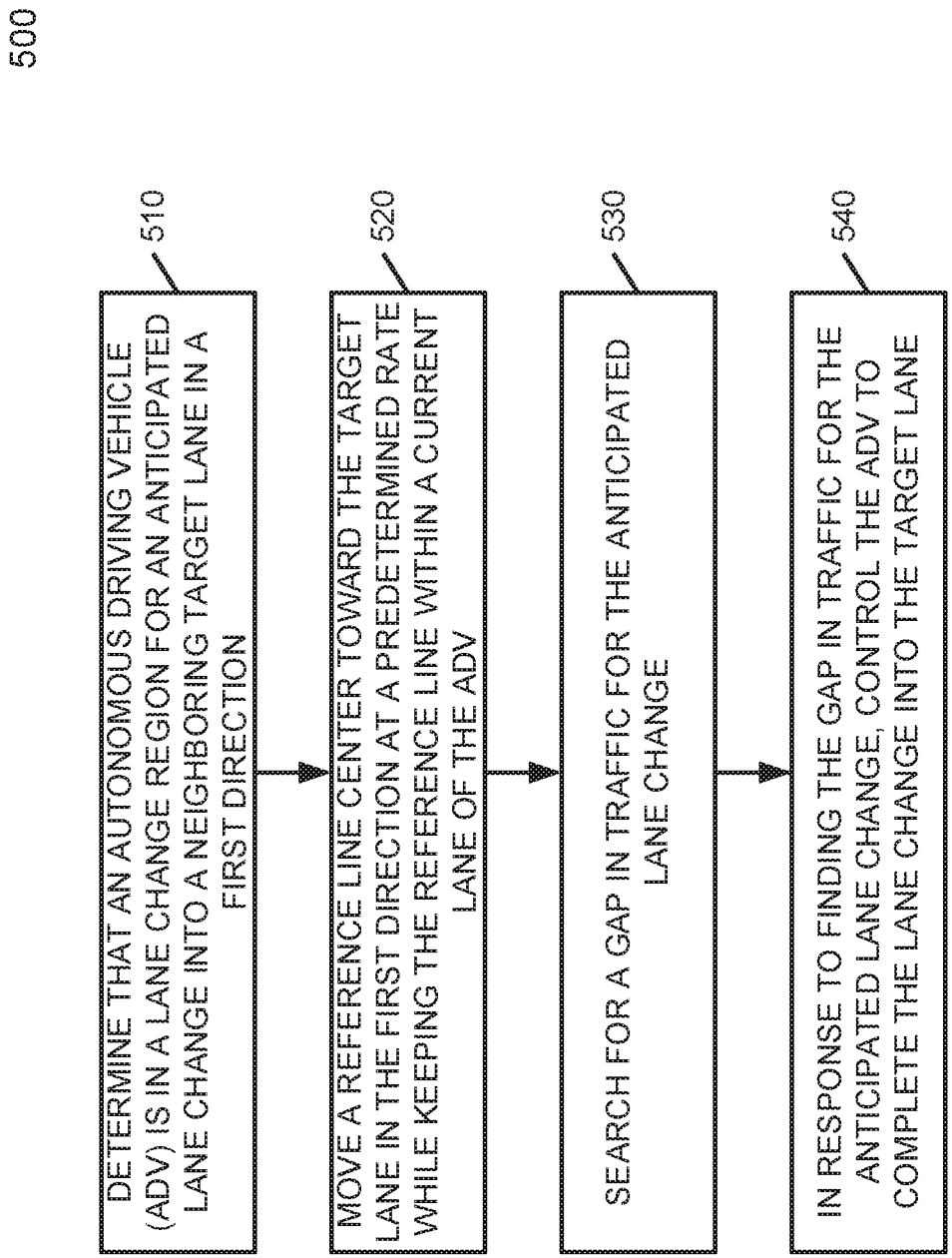
FIG. 5 is a flowchart illustrating an example method for executing a lane change according to one embodiment.

Referring to FIG. 5, a flowchart illustrating an example method 500 for executing a lane change according to one embodiment is shown. The method 500 can be implemented in hardware, software, or a combination thereof. At block 510, that an ADV is in a lane changing region for an anticipated lane change into a neighboring target lane in a first direction is determined. The first direction is either a left direction or a right direction in a direction of travel of the ADV. At block 520, a reference line is moved toward the target lane in the first direction at a predetermined rate while the reference line is kept within a current lane of the ADV. A trajectory or path is then planned based on the modified reference line such that the ADV moves within the current lane but towards the lane boundary between the current lane and the target lane. At block 530, a gap in traffic for the anticipated lane change is searched for. Thereafter, at block 540, in response to finding the gap in traffic for the anticipated lane change, the ADV is controlled to complete the lane change into the target lane.

Figure 6:
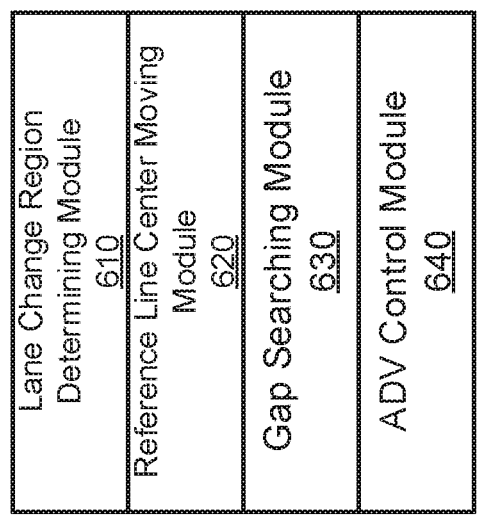
FIG. 6 is a block diagram illustrating various modules that can be used in embodiments.

Referring to FIG. 6, a block diagram 600 illustrating various modules that can be used in embodiments is shown. The modules 610-640 can be implemented in hardware, software, or a combination thereof. Modules 610-640 may be implemented as a part of lane changing module 308. A lane changing region determining module 610 determines that an ADV is in a lane changing region for an anticipated lane change into a neighboring target lane in a first direction. A lane changing region refers to a region within which a vehicle can legally change lane according to the traffic rules. For example, if a lane line between two adjacent lanes is a broken or dash line, a vehicle is allowed to change lane. Such lane changing region information can be provided by routing module 307 in view of the map or other traffic information. Alternatively, it can also be determined based on perception, for example, by recognizing the lane line patterns based on images, etc. The first direction is either a left direction or a right direction in a direction of travel of the ADV. A reference line moving module 620 moves a reference line toward the target lane in the first direction at a predetermined rate while the reference line is kept within a current lane of the ADV. A gap searching module 630 searches for a gap in traffic for the anticipated lane change. An ADV control module 640 controls, in response to finding the gap in traffic for the anticipated lane change, the ADV to complete the lane change into the target lane.

Therefore, according to embodiments of the disclosure, in anticipation of a lane change, the ADV, while traveling forward, also moves laterally toward the boundary of the current lane in the direction of the anticipated lane change before the lane change is actually executed. The lateral in-lane motion of the ADV prior to the lane change serves to signal the anticipated lane change to (the drivers of) the vehicles in the target lane, and also reduces the lateral distance that needs to be traversed when the lane change is executed. The signaling as well as the lateral in-lane motion toward the target lane makes it more likely that a gap in traffic can be successfully found for the safe execution of the lane change.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   determining that an autonomous driving vehicle (ADV) moving in a current lane is in a lane changing region for an anticipated lane change into a target lane adjacent to the current lane in a first direction;
   modifying a reference line of the current lane towards the target lane in the first direction at a predetermined rate while keeping the reference line within the current lane of the ADV, wherein modifying the reference line of the current lane towards the target lane in the first direction at the predetermined rate comprises deflecting the reference line towards the target lane away from a direction of the current lane by a predetermined deflection angle;
   planning a trajectory based on the modified reference line to drive the ADV towards a lane boundary between the current lane and the target lane, while keeping the ADV within the current lane;
   searching for a gap in traffic between the ADV and one or more moving obstacles moving within the target lane for the anticipated lane change; and
   in response to finding the gap in traffic for the anticipated lane change, controlling the ADV to complete the lane change into the target lane.

2. The method of claim 1, wherein the first direction is either a left direction or a right direction in a direction of travel of the ADV.

3. The method of claim 1, wherein the predetermined rate is between 0.1 meters per second (m/s) and 0.5 m/s in a lateral speed.

4. The method of claim 1, wherein modifying the reference line towards the target lane in the first direction is subject to a predetermined maximum lateral speed.

5. The method of claim 1, wherein prior to finding the gap in traffic for the anticipated lane change, the reference line is moved towards the target lane in the first direction until a distance between the reference line and the lane boundary of the current lane of the ADV is at or below a predetermined threshold.

6. The method of claim 5, wherein the predetermined threshold is 0.2 meters.

7. The method of claim 1, wherein the predetermined deflection angle is 3 degrees.

8. A non-transitory machine-readable medium having instructions stored therein, which when executed by a processor, cause the processor to perform operations, the operations comprising:
   determining that an autonomous driving vehicle (ADV) moving in a current lane is in a lane changing region for an anticipated lane change into a target lane adjacent to the current lane in a first direction;
   modifying a reference line of the current lane towards the target lane in the first direction at a predetermined rate while keeping the reference line within the current lane of the ADV, wherein modifying the reference line of the current lane towards the target lane in the first direction at the predetermined rate comprises deflecting the reference line towards the target lane away from a direction of the current lane by a predetermined deflection angle;
   planning a trajectory based on the modified reference line to drive the ADV towards a lane boundary between the current lane and the target lane, while keeping the ADV within the current lane;
   searching for a gap in traffic between the ADV and one or more moving obstacles moving within the target lane for the anticipated lane change; and
   in response to finding the gap in traffic for the anticipated lane change, controlling the ADV to complete the lane change into the target lane.

9. The machine-readable medium of claim 8, wherein the first direction is either a left direction or a right direction in a direction of travel of the ADV.

10. The machine-readable medium of claim 8, wherein the predetermined rate is between 0.1 meters per second (m/s) and 0.5 m/s in a lateral speed.

11. The machine-readable medium of claim 8, wherein modifying the reference line towards the target lane in the first direction is subject to a predetermined maximum lateral speed.

12. The machine-readable medium of claim 8, wherein prior to finding the gap in traffic for the anticipated lane change, the reference line is moved towards the target lane in the first direction until a distance between the reference line and the lane boundary of the current lane of the ADV is at or below a predetermined threshold.

13. The machine-readable medium of claim 12, wherein the predetermined threshold is 0.2 meters.

14. The machine-readable medium of claim 8, wherein the predetermined deflection angle is 3 degrees.

15. A data processing system, comprising:
a processor; and
a memory coupled to the processor to store instructions, which when executed by the processor, cause the processor to perform operations, the operations including:
determining that an autonomous driving vehicle (ADV) moving in a current lane is in a lane changing region for an anticipated lane change into a target lane adjacent to the current lane in a first direction;
modifying a reference line of the current lane towards the target lane in the first direction at a predetermined rate while keeping the reference line within the current lane of the ADV, wherein modifying the reference line of the current lane towards the target lane in the first direction at the predetermined rate comprises deflecting the reference line towards the target lane away from a direction of the current lane by a predetermined deflection angle;
planning a trajectory based on the modified reference line to drive the ADV towards a lane boundary between the current lane and the target lane, while keeping the ADV within the current lane;
searching for a gap in traffic between the ADV and one or more moving obstacles moving within the target lane for the anticipated lane change; and
in response to finding the gap in traffic for the anticipated lane change, controlling the ADV to complete the lane change into the target lane.

16. The system of claim 15, wherein the first direction is either a left direction or a right direction in a direction of travel of the ADV.

17. The system of claim 15, wherein the predetermined rate is between 0.1 meters per second (m/s) and 0.5 m/s in a lateral speed.

18. The system of claim 15, wherein modifying the reference line towards the target lane in the first direction is subject to a predetermined maximum lateral speed.

19. The system of claim 15, wherein prior to finding the gap in traffic for the anticipated lane change, the reference line is moved towards the target lane in the first direction until a distance between the reference line and the lane boundary of the current lane of the ADV is at or below a predetermined threshold.

20. The system of claim 19, wherein the predetermined threshold is 0.2 meters.

21. The system of claim 15, wherein the predetermined deflection angle is 3 degrees.

* * * * *